United States Patent
Nguyen et al.

(10) Patent No.: US 6,214,944 B1
(45) Date of Patent: Apr. 10, 2001

(54) METHOD FOR PRESSURIZING A PROPYLENE POLYMERIZATION REACTOR

(75) Inventors: Thanh Nguyen, Sugarland; Wes Parker, La Porte; Don Austin Duggar, Webster; Aron Griffith, Humble, all of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/243,217

(22) Filed: Feb. 2, 1999

(51) Int. Cl.$^7$ ................................................ C08F 110/06
(52) U.S. Cl. ............................. 526/73; 526/72; 526/351
(58) Field of Search ........................ 526/72, 352, 73, 526/64, 351

(56) References Cited

U.S. PATENT DOCUMENTS

| | | | |
|---|---|---|---|
| 3,242,150 | 3/1966 | Scoggin | 260/88.2 |
| 3,324,093 | 6/1967 | Alleman | 260/88.2 |
| 4,007,321 | 2/1977 | Scholz et al. | 526/64 |
| 4,582,816 | 4/1986 | Miro | 502/502 |
| 4,754,007 | 6/1988 | Pullukat et al. | 526/130 |
| 4,990,595 | * 2/1991 | Traechner et al. | 528/483 |
| 5,391,654 | 2/1995 | Ahvenainen et al. | 526/64 |
| 6,084,041 | * 7/2000 | Andtsjo et al. | 526/65 X |

FOREIGN PATENT DOCUMENTS 0057420    8/1982   (EP) .

OTHER PUBLICATIONS

Kenneth B. Sinclair; Third–Generation Polyolefin Technologies and Their Capabilities; Feb. 26, 1995.

* cited by examiner

Primary Examiner—Fred Teskin
(74) Attorney, Agent, or Firm—Jim D. Wheelington

(57) ABSTRACT

A system for pressurizing a propylene polymerization reactor includes: a pressurization vessel including an internal heat exchanger; a pressure sensor for monitoring the pressure in the vessel, the pressure sensor providing a signal indicative of the pressure in the vessel; a control valve for supplying heated gas to a first region of the vessel in response to signals from the pressure sensor, the first region of the vessel being maintained above the critical temperature and pressure of propylene; a temperature sensor for monitoring the temperature in a second region of the pressurization vessel, the temperature sensor providing a signal indicative of the temperature in the second region of the vessel; and a control valve for supplying a cooling medium to the internal heat exchanger to cool propylene in the second region below the critical temperature of propylene at the pressure in the pressurization vessel.

10 Claims, 3 Drawing Sheets

— w/ CP level vs. cyl. wt.
— w/ cyl. wt.

METHOD FOR PRESSURIZING A PROPYLENE POLYMERIZATION REACTOR

TECHNICAL FIELD

The present invention relates, in general, to a system, apparatus and method for polymerizing propylene including a propylene pressurization vessel operated under supercritical conditions.

BACKGROUND OF THE INVENTION

Without limiting the scope of the present invention, the background of the invention is described with reference to propylene polymerization and copolymerization reactors and systems. Conventional propylene polymerization systems have been operated with temperature and pressure ranges well below the critical region of propylene, for example, below a critical temperature ($T_c$) of 197.2° F. and a critical pressure of 655.4 psig. For example, in more than one conventional process the polymerization system is typically operated at a temperature of about 140° F. and 180° F. and a pressure in the range of 440 to 480 psig. Surprisingly, however, it has been discovered that with presently available propylene polymerization catalysts, production is increased if the systems are operated outside of the conventional temperature and pressure ranges previously employed.

However, in order to take advantage of the unexpected benefits of operating outside of conventional temperature and pressure ranges, it has been found necessary to provide a propylene pressurization vessel that is operated above the critical temperature and pressure range of propylene, e.g., in the supercritical state. Thus, there exists a need for a propylene polymerization system that includes a pressurization vessel adapted to operate outside of conventional parameters.

SUMMARY OF THE INVENTION

The present invention provides a method and apparatus for pressurizing a propylene polymerization system, including a pressurization vessel operated under supercritical conditions. The vessel contains propylene in a first region at supercritical conditions and propylene in a second region at subcritical conditions. In one embodiment of the invention, pressure in the pressurization vessel is controlled by the rate of injection of superheated propylene in the supercritical region. The temperature of propylene in the zone containing the compressible supercritical phase may be maintained by controlling the temperature of the superheated propylene feed. Preferably the temperature of the superheated propylene is in the range of 200° F. to 280° F., more preferably, the temperature of the superheated propylene is approximately 240° F. The pressure of the vessel is preferably in the range of 660 to 800 psig, more preferably in the range of 700 to 730 psig, most preferably in the range of approximately 710 psig. The temperature of the dense subcooled liquid propylene in the vessel is typically in the range of 80° F. to 140° F., preferably 90° F. to 110° F., and most preferably approximately 100° F. Operation of the pressurization vessel in this mode allows a propylene polymerization system to be pressurized and operated at levels above conventional polymerization temperatures and pressures, for example, at pressures of 660 to 700 psig.

BRIEF DESCRIPTION OF THE DRAWINGS

For a more complete understanding of the present invention, including its features and advantages, reference is now made to the detailed description of the invention, taken in conjunction with the accompanying drawings in which like numerals identify like parts and in which.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not limit the scope of the invention.

EXAMPLE 1

Figure 1:
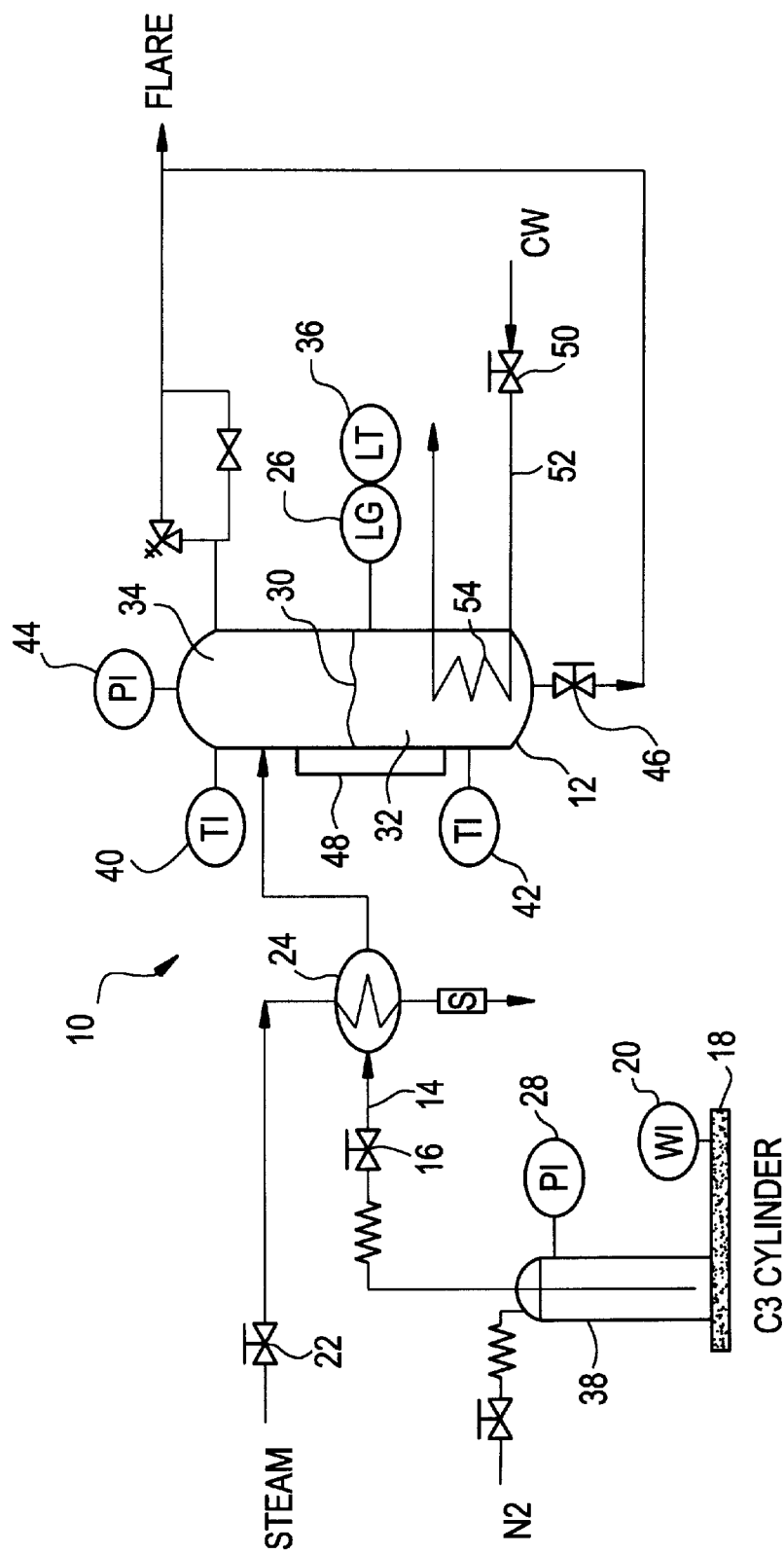
FIG. 1 is a schematic of an experimental apparatus for testing the control and operation of a vessel containing propylene at supercritical conditions and propylene at subcritical conditions.

In order to determine whether effective control of a propylene pressurization vessel could be maintained under supercritical conditions, an experimental apparatus 10 was assembled as generally as illustrated in FIG. 1. Propylene was charged to the supply cylinder 38 which was then pressurized with nitrogen. The valve 16 between the supply cylinder 38 and the pressurization vessel 12 was opened to place an initial charge of propylene into the vessel 12 through feed line 14 and heat exchanger 24. After the initial charge of propylene had been introduced into vessel 12, the valve 16 was closed and the supply cylinder 38 was refilled with propylene. As illustrated, supply cylinder 38 is mounted on scale 18 with a weight indicator 20 for monitoring the weight of the cylinder along with a pressure monitor 28 for monitoring the pressure of the cylinder.

The steam supply was turned on with valve 22 to supply heat and to allow the level sensor, a differential pressure ("DP") cell 26, to equilibrate. After the DP cell 26 had stabilized, the propylene control valve 16 was opened and the vessel 12 was brought up to operating pressure, in this case 710 psig. Readings from the DP cell 26 were transmitted to a recording device by level transmitter 36. Superheated propylene was injected into the top of the vessel 12 to keep the pressure constant while excess liquid was drained off the bottom of the tank through discharge valve 46 until the desired level in the vessel was achieved.

In order to maintain the temperature in the lower section of the vessel 12 below the temperature in the upper region 34 of the vessel, water was supplied to cooling coil 54 via cooling water valve 50 and supply line 52. Below the critical pressure, the transition 30 between the dense (liquid) region 32 and compressible (gas) region 34 in the vessel 12, as viewed in sight glass 48, was apparent. However, as the pressure was increased to 710 psig and the operating conditions moved outside of the phase envelop, the interface (as viewed through a sight glass) between the vapor and liquid phases in the vessel disappeared. However, due to the temperature gradient in the vessel, there still existed a dense and compressible region inside the vessel.

Since the pressure in the vessel decreased as propylene condensed, either on the interior wall of the vessel or at the interface of the dense (liquid) region 32 and the compressible (vapor) region 34, superheated propylene was added intermittently to maintain the desired pressure in the vessel.

Two different experimental procedures were employed during the test. First, the unit was operated in an increasing level mode, e.g., the level of the dense (liquid) region was allowed to increase as propylene in the compressible (vapor) region of the vessel condensed. Next, the vessel was operated in a constant level mode. In the constant level mode, fluid was drained from the bottom region 32 of the vessel via discharge valve 46 in order to maintain the liquid level in the vessel within a predetermined range near the middle of the vessel.

Figure 2:
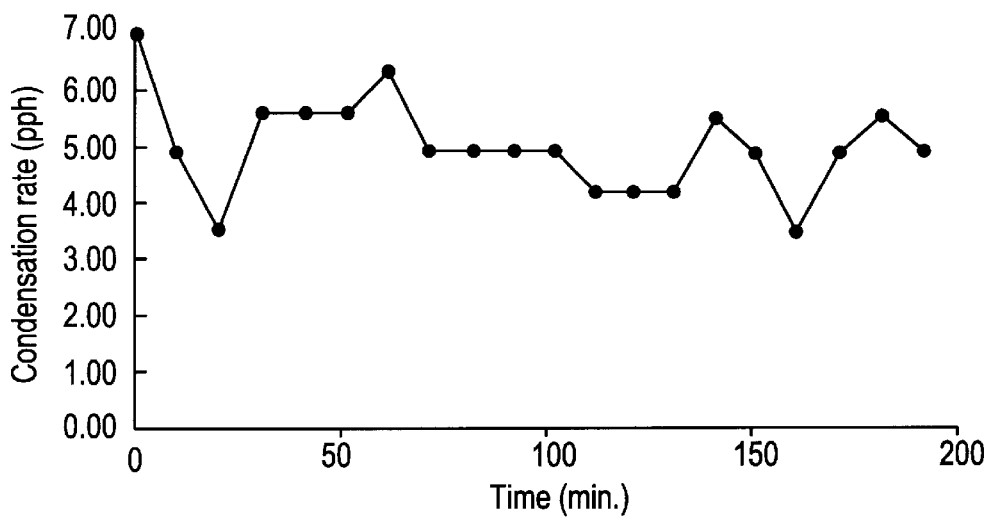
FIGS. 2 and 3 are graphical representations of propylene condensation vs. time under varying conditions utilizing the apparatus of FIG. 1.
Figure 3:
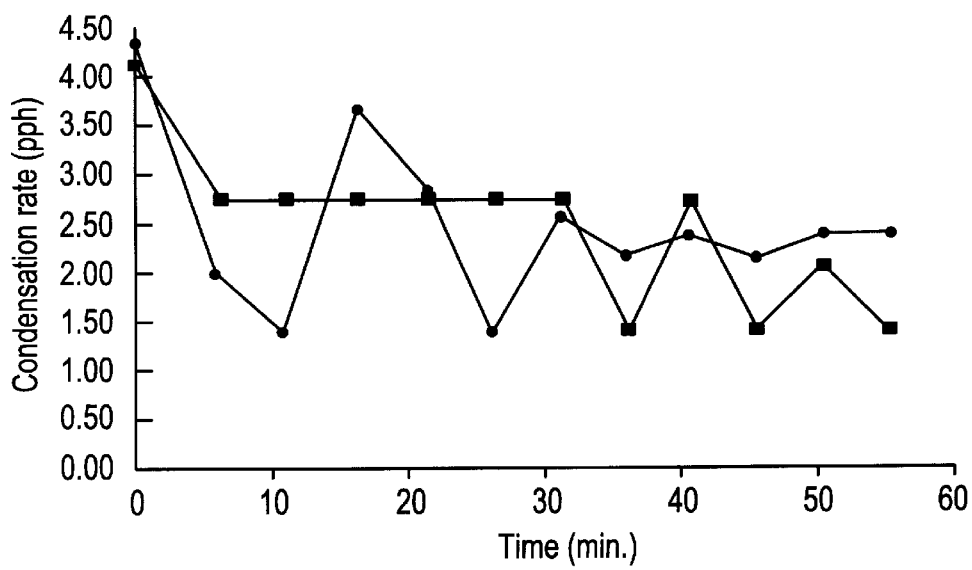

In each case, DP readings, liquid and vapor temperatures, and supply cylinder weight were recorded at fixed time intervals as indicated in Tables 1 and 2 below:

As illustrated by the above example, a propylene pressurization vessel designed, controlled and operated with distinct regions of the vessel ning propylene in a dense (liquid) phase and propylene in a compressible supercritical phase. To achieve a desired pressure in the pressurization vessel, the vessel may be pressurized with superheated propylene. Graphical representations of condensation rates vs. time are presented in FIGS. 2 and 3 in order to further illustrate the test results.

In one embodiment of the invention, pressure in the vessel may be controlled by the injection of completely vaporized, superheated propylene in the supercritical region. The temperature of propylene in the zone containing the compressible supercritical phase may be maintained by controlling the temperature of the superheated propylene. Preferably, the temperature of the superheated propylene is in the range of 200° F. to 280° F., more preferably, the temperature of the

TABLE 1

Condensation Rates at 710 psig with increasing level

| Pressure (psig) | Time (min) | Vapor Temp (F.) | Liquid Temp (F.) | Cylinder wt. (lbs) | DP level Reading | Time Interval (min) | Condensation rate w/DP level vs. cyl. wt (lbs/hr) | Condensation rate w/cyl. wt. (lbs/hr) |
|---|---|---|---|---|---|---|---|---|
| | 0 | | | 147.0 | | | | |
| 710 | 5 | 273.0 | 100.2 | 145.7 | 205 | 5.00 | | |
| 710 | 10 | 269.0 | 96.6 | 145.4 | 225 | 5.00 | 4.36 | 4.18 |
| 710 | 15 | 267.6 | 96.1 | 145.2 | 234 | 5.00 | 1.96 | 2.79 |
| 710 | 20 | 264.7 | 96.6 | 145.0 | 240 | 5.00 | 1.31 | 2.79 |
| 710 | 25 | 263.1 | 98.0 | 144.8 | 257 | 5.00 | 3.71 | 2.79 |
| 710 | 30 | 260.1 | 98.1 | 144.6 | 270 | 5.00 | 2.84 | 2.79 |
| 710 | 35 | 258.0 | 99.2 | 144.4 | 276 | 5.00 | 1.31 | 2.79 |
| 710 | 40 | 255.6 | 99.3 | 144.2 | 288 | 5.00 | 2.62 | 2.79 |
| 710 | 45 | 253.2 | 99.5 | 144.1 | 298 | 5.00 | 2.18 | 2.79 |
| 710 | 50 | 250.7 | 99.5 | 143.9 | 309 | 5.00 | 2.40 | 2.79 |
| 710 | 55 | 248.2 | 99.5 | 143.8 | 319 | 5.00 | 2.18 | 1.39 |
| 710 | 65 | 243.9 | 99.5 | 143.5 | 341 | 10.00 | 2.40 | 2.09 |
| 710 | 70 | 242.9 | 100.4 | 143.4 | 352 | 5.00 | 2.40 | 1.39 |

TABLE 2

Condensation Rates at 710 psig with constant level

| Pressure (psig) | Time (min) | Time Interval (min) | Vapor Temp (F.) | Liquid Temp (F.) | DP level Reading | Cylinder wt. (lbs) | Cond. Rate w/cyl. wt (lbs//hr) | Cond Rate w/cyl. wt (lbs//hr) | Cond. Rate w/cyl. wt. (lbs//hr) |
|---|---|---|---|---|---|---|---|---|---|
| 710 | 0 | 0 | 307.6 | 68.6 | 200–210 | 156.2 | | | |
| 710 | 10 | 10 | 303.1 | 78.8 | " | 155.2 | 6.97 | | |
| 710 | 20 | 10 | 292.3 | 90.1 | " | 154.5 | 4.88 | | |
| 710 | 30 | 10 | 282.4 | 96.6 | " | 154.0 | 3.49 | 5.11 | |
| 710 | 40 | 10 | 282.9 | 81 | " | 153.2 | 5.55 | | |
| 710 | 50 | 10 | 282.4 | 74.6 | " | 152.4 | 5.55 | | |
| 710 | 60 | 10 | 257.6 | 72.3 | " | 151.6 | 5.58 | 5.58 | 5.34 |
| 710 | 70 | 10 | 286.2 | 73 | " | 150.7 | 6.27 | | |
| 710 | 80 | 10 | 286.4 | 81.3 | " | 150 | 4.88 | | |
| 710 | 90 | 10 | 284.5 | 87.6 | " | 149.3 | 4.88 | 5.34 | |
| 710 | 100 | 10 | 281.3 | 99.1 | " | 148.6 | 4.88 | | |
| 710 | 110 | 10 | 279 | 95 | " | 147.9 | 4.88 | | |
| 710 | 120 | 10 | 275.7 | 99 | " | 147.3 | 4.18 | 4.65 | 5.00 |
| 710 | 130 | 10 | 273 | 93.4 | " | 146.7 | 4.18 | | |
| 710 | 140 | 10 | 269.1 | 97.5 | " | 146.1 | 4.18 | | |
| 710 | 150 | 10 | 278.2 | 93.4 | " | 145.3 | 5.58 | 4.65 | |
| 710 | 160 | 10 | 277 | 98.8 | " | 144.6 | 4.88 | | |
| 710 | 170 | 10 | 271.6 | 91.8 | " | 144.1 | 3.49 | | |
| 710 | 180 | 10 | 270.5 | 97 | " | 143.4 | 4.88 | 4.42 | 4.53 |
| 710 | 190 | 10 | 279.1 | 92.8 | " | 142.6 | 5.58 | | |
| 710 | 200 | 10 | 276.4 | 95.9 | " | 141.9 | 4.88 | | | superheated propylene is in the range of approximately 240° F. The pressure of the vessel is preferably in the range of 660 to 800 psig, more preferably in the range of 700 to 730 psig, most preferably in the range of approximately 710 psig. The temperature of the dense subcooled liquid propylene in the vessel is typically in the range of 80° F. to 140° F., preferably 90° F. to 110° F., and most preferably approximately 100° F. Operation of the pressurization vessel in this mode allows a propylene polymerization system to be pressurized and operated at levels above conventional polymerization temperatures and pressures, for example at pressures of 660 to 700 psig.

Figure 4:
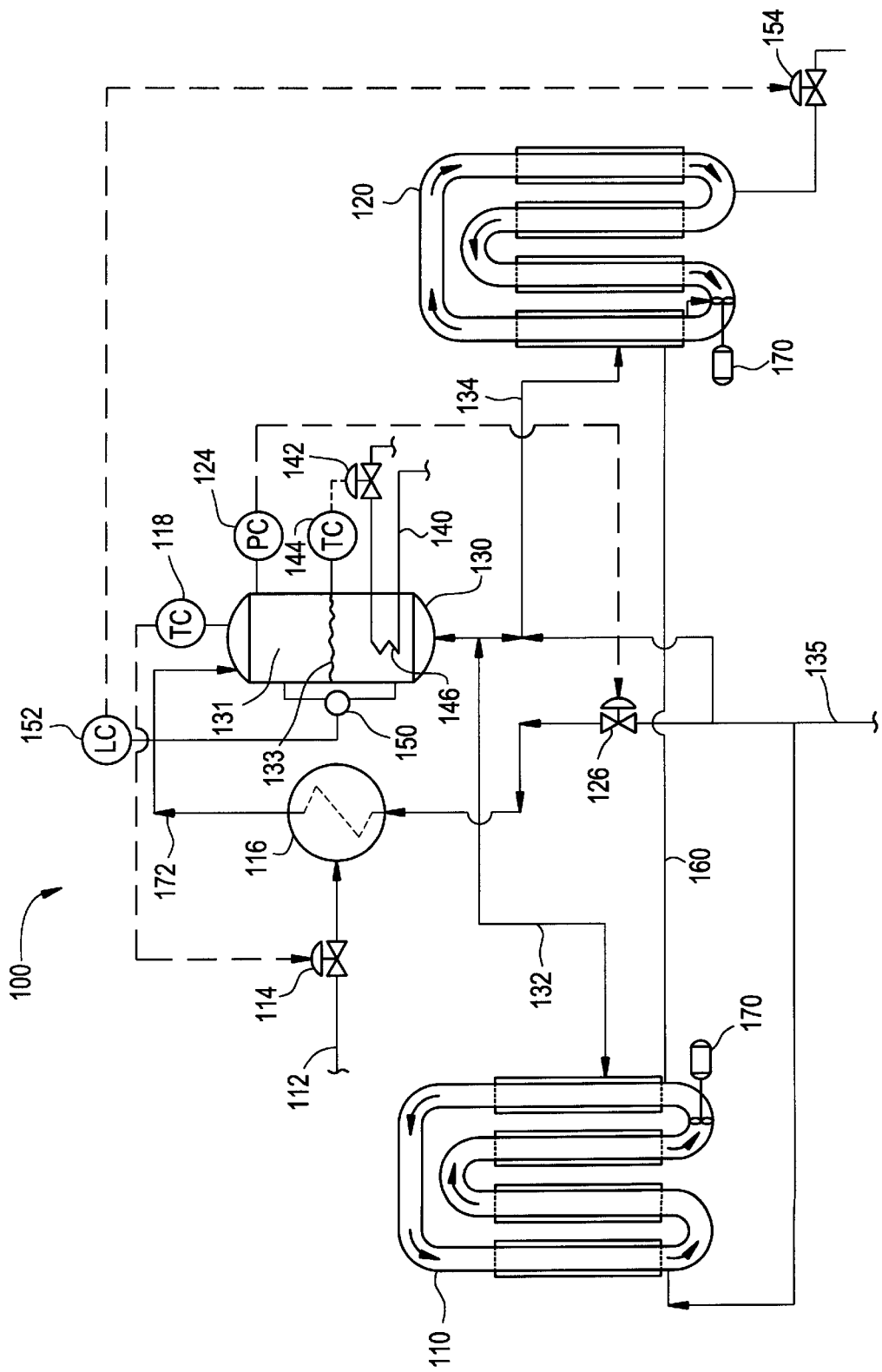
FIG. 4 is a schematic of a propylene polymerization system utilizing the pressurization system of the present invention.

Referring now to FIG. 4, a propylene polymerization system or apparatus embodying the invention is schematically illustrated. As illustrated, the system includes a first loop reactor 110, a second loop reactor 120 connected in series with the first loop reactor via line 160, and a propylene pressurization system generally designated 100. The loop reactors 110 and 120 are provided with agitators 170 to promote mixing. Although illustrated in the context of a double loop reactor system, the pressurization system is, of course, applicable to single reactor systems and reactors other than loop-type reactors.

Propylene is supplied to the system via feed line 135 which provides propylene to both loop reactors and the pressurization system 100. Propylene fed to the pressurization system passes through a heat exchanger 116. A steam supply 112 and control valve 114 are provided for heating heat exchanger 116.

Pressurization system 100 includes a pressurization vessel 130 which is equipped with an internal cooling coil 146 positioned in the lower portion of the vessel. Cooling water is supplied to the coil via supply line 140 and the flow of cooling water is regulated by control valve 142. The first loop reactor 110 and second loop reactor 120 communicate with the pressurization vessel 130 via lines 132 and 134.

Pressurization vessel 130 is equipped with an upper temperature sensor/controller 118 located in the upper portion of the vessel 130. Alternatively, the temperature sensor 118 may be located in propylene feed line 172 between the heat exchanger 116 and the pressurization vessel 130. The signal from the sensor 118 is transmitted to control valve 114 in steam supply line 112 to regulate the flow of steam to heat exchanger 116.

Pressurization vessel 130 is also provided with a DP cell 150 that provides a signal to level controller 152. The signal from level controller 152 is transmitted to control valve 154 which regulates the discharge of propylene and polymer from the second loop reactor 120. Thus, if the fluid level in pressurization vessel 130 rises above the desired level, the control valve 154 opens to release propylene and polymer from the system. Alternatively, if the level in the vessel 130 drops below the desired level, the level controller 152 transmits a signal to control valve 154 to close the valve.

Pressure in the vessel 130 is regulated by the addition of superheated propylene vapor. The pressurization vessel 130 is equipped with a pressure controller 124 which is operatively connected to control valve 126. In operation, as the pressure in the vessel 130 drops, pressure controller 124 transmits a signal to control valve 126. Control valve 126 opens in response to the signal, supplying propylene to heat exchanger 116 wherein the propylene is superheated prior to introduction to the vessel 130. During operation, pressure in the vessel is preferably in the range of 660 to 800 psig, more preferably in the range of 700 to 730 psig, and most preferably in the range of approximately 710 psig.

In operation, propylene is present in the pressurization vessel 130 in two distinct phases, a superheated compressible (vapor) phase, corresponding to upper region 131 of the vessel, and a subcooled dense (liquid) phase corresponding to region 133 in the lower portion of the vessel. Typically, the temperature in the upper region 131 is maintained in the range of 200° F. to 280° F. Preferably, the temperature of the superheated propylene in the upper region 131 of the vessel is in the range of approximately 240° F. The temperature of the dense subcooled liquid propylene in the lower region 133 of the pressurization vessel is typically in the range of 80° F. to 140° F., preferably 90° F. to 110° F., and most preferably approximately 100° F. As used herein, the term "subcooled" refers to temperature below the critical temperature of propylene at the relevant pressure.

The temperature in the lower region 133 of the pressurization vessel is maintained with internal cooling coil 146. The pressurization vessel 130 is equipped with a temperature sensor 144 at a location corresponding to the lower region 133 of the vessel. The flow of cooling water to the coil is controlled by control valve 142 which opens and closes in response to signals received from sensor 144. As will be appreciated by those skilled in the art, other cooling mediums, such as the propylene feed to the second reactor 120, could be utilized as the cooling medium.

An important feature of the present invention is the combined use of internal cooling of the pressurization vessel 130 and a differential pressure cell 150 in order to control the level of the dense subcooled liquid propylene in the vessel. Although propylene is present in the pressurization vessel in two phases, e.g., a compressible superheated phase and dense subcooled phase, under supercritical conditions the interface between the two phases becomes visually undetectable. Consequently, a typical level monitoring device, for example a sight glass, cannot be used to control the dense, or fluid phase, level in the pressurization vessel. Thus, an alternative level monitoring device, e.g., a differential pressure, is needed to monitor the fluid phase level in the vessel. However, in order for a differential pressure cell to be utilized as a level monitoring device, the density gradient between the superheated propylene in the upper region 131 of the vessel 130 and the dense, subcooled propylene in the lower region of the vessel must be significant enough to allow the DP cell to detect a pressure differential due to the density gradient. The use of an internal cooling coil 146 in vessel 130 to cool the dense liquid phase propylene in the lower region 133 of the vessel to a temperature below the critical temperature provides the required density gradient, thereby allowing the use of a DP cell as a level monitoring device.

For example, in one embodiment of the invention, the vessel is operated at 710 psig. The temperature in a first or upper region 131 of the vessel, corresponding to the compressible, supercritical propylene, is maintained at approximately 240° F., whereas the dense, liquid phase propylene in the lower or second region 133 of the vessel 130 is cooled to approximately 100° F. though the use of internal cooling coil 146. Since the specific volume of propylene at 710 psig and 100° F. is 0.033 ft$^3$/lb and the specific volume of propylene at 710 psig and 240° F. is 0.145 ft$^3$/lb, the density ratio between the superheated propylene in the upper region 131 and the subcooled liquid propylene in the lower region is 4.39. This density gradient is sufficient to allow a DP cell to be used as a level indication device for vessel 130.

While certain embodiments of the invention have been illustrated for the purposes of this disclosure, numerous changes in the composition, method and article of manufacture presented herein may be made by those skilled in the art, such changes being embodied within the scope and spirit of the present invention as defined by the appended claims.

What is claimed is:

1. A method of polymerizing propylene comprising the steps of:
   (a) injecting a heated gas into a pressurization vessel to maintain a volume of propylene in a first region of the pressurization vessel in a supercritical temperature and pressure range;
   (b) cooling a second region of the vessel to maintain the temperature of the propylene in the second region below the critical temperature of propylene at the pressure in the pressurization vessel; and
   (c) polymerizing propylene at a pressure of 660 to 700 psig.

2. The method of claim 1 further comprising the step of maintaining the temperature of propylene in the first region of the pressurization vessel in the range of 200° F. to 280° F.

3. The method of claim 1 further comprising the step of maintaining the temperature in the first region of the pressurization vessel at approximately 240° F.

4. The method of claim 1 wherein the temperature in the second region of the pressurization vessel is maintained in the range from 80° F. to 140° F.

5. The method of claim 1 wherein the temperature in the second region of the pressurization vessel is maintained at approximately 100° F.

6. A method for pressurizing a propylene polymerization system comprising the steps of:
   (a) injecting a heated gas into a pressurization vessel to maintain a volume of propylene in a first region of the pressurization vessel in a supercritical temperature and pressure range;
   (b) cooling a second region of the vessel to maintain the temperature of the propylene in the second region below the critical temperature of propylene at the pressure in the pressurization vessel.

7. The method of claim 6 further comprising the step of maintaining the temperature of propylene in the first region of the pressurization vessel in the range of 200° F. to 280° F.

8. The method of claim 7 further comprising the step of maintaining the temperature in the first region of the pressurization vessel at approximately 240° F.

9. The method of claim 7 wherein the temperature in the second region of the pressurization vessel is maintained in the range from 80° F. to 140° F.

10. The method of claim 7 wherein the temperature in the second region of the pressurization vessel is maintained at approximately 100° F.

* * * * *